C. R. JERNBERG.
DRAFT GEAR BARREL AND METHOD OF MAKING SAME.
APPLICATION FILED AUG. 27, 1920.
1,412,785.
Patented Apr. 11, 1922.
2 SHEETS—SHEET 1.
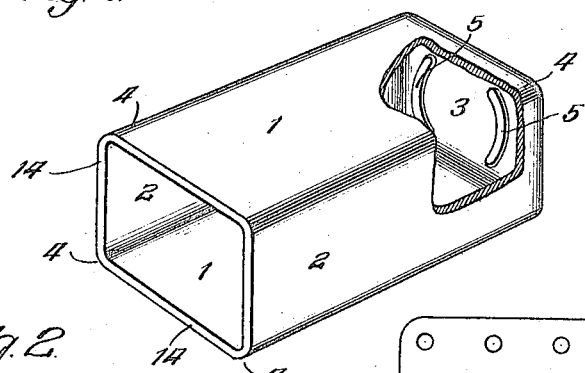
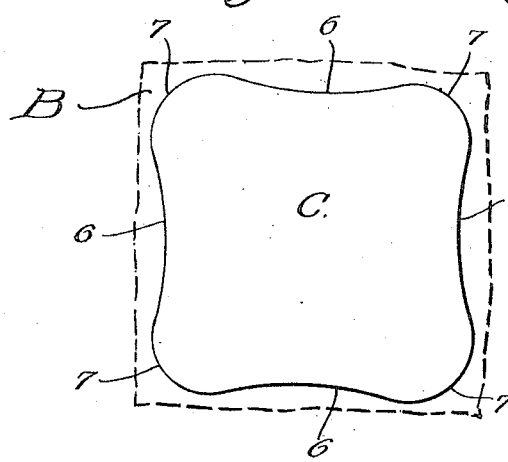
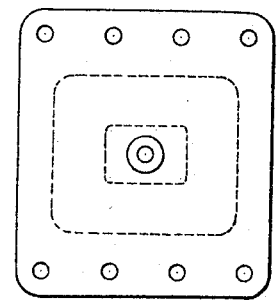
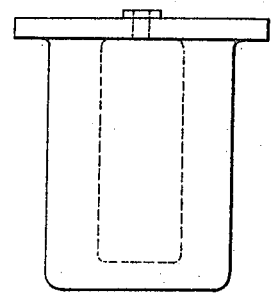
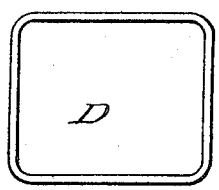
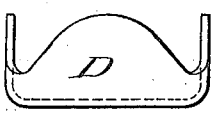
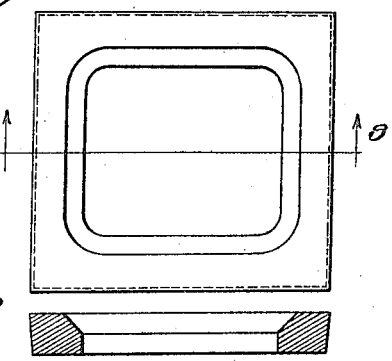
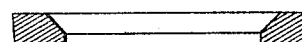
Inventor:
C. Richard Jernberg,
By his Atty.

C. R. JERNBERG.
DRAFT GEAR BARREL AND METHOD OF MAKING SAME.
APPLICATION FILED AUG. 27, 1920.
1,412,785.
Patented Apr. 11, 1922.
2 SHEETS—SHEET 2.
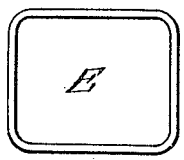
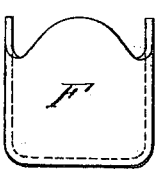
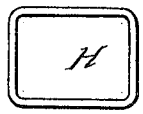
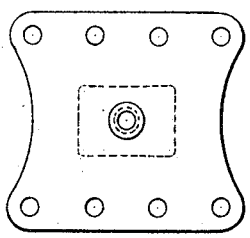
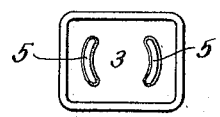
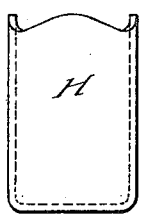
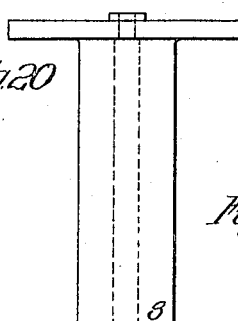
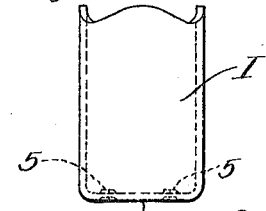
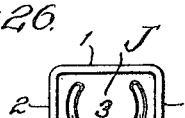
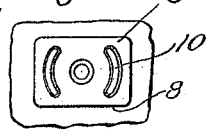
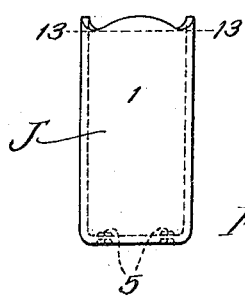
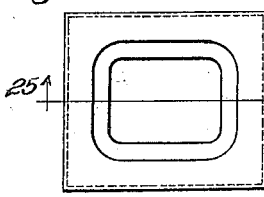
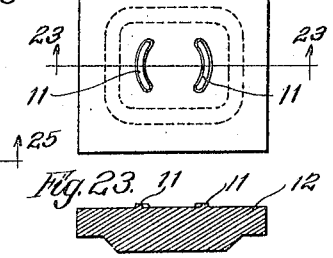
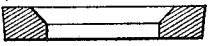
Inventor:
C. Richard Jernberg,
By Taylor E Brown his Atty.

UNITED STATES PATENT OFFICE.

CARL RICHARD JERNBERG, OF CHICAGO, ILLINOIS, ASSIGNOR TO STANDARD FORGINGS COMPANY, OF CHICAGO, ILLINOIS, A CORPORATION OF ILLINOIS.

DRAFT-GEAR BARREL AND METHOD OF MAKING SAME.

1,412,785.  Specification of Letters Patent.  Patented Apr. 11, 1922.

Application filed August 27, 1920. Serial No. 406,291.

*To all whom it may concern:*

Be it known that I, CARL RICHARD JERNBERG, a citizen of the United States, residing at Chicago, in the county of Cook and State of Illinois, have invented certain new and useful Improvements in Draft-Gear Barrels and Methods of Making Same, of which the following is a specification, reference being had to the accompanying drawings, and to the reference characters marked thereon, which form a part of this specification.

This invention relates to seamless, drawn steel draft gear barrels or housings and the method of making the same.

Heretofore, barrels or housings for draft gears have been made from cast steel or cast iron, and have developed certain disadvantages such as blow holes and sand pockets; and, moreover, have been attended with certain disadvantages in manufacture owing to the shrinkage of the cast metal in cooling.

The barrel of this invention is peculiarly applicable as a housing for draft gears of the type set forth in U. S. Letters Patent No. 1,263,374, issued April 23, 1918, but is also applicable to other types and uses.

One of the objects of my invention is to produce a draft gear barrel or housing in the manufacture of which blow holes, shrinkage and sand pockets are eliminated; one which has a smooth and fine interior as well as exterior finish, and one which is stronger and far superior to a barrel or housing of the same cross sectional area and dimensions made of cast steel, cast iron, or other metal.

The advantages of the present invention will be apparent as I proceed with this specification.

In the drawings:

Fig. 1 is a perspective view of a seamless, drawn steel draft gear barrel or housing, made in accordance with my invention; a portion being broken away to show the interior construction.

Fig. 2 is a plan view showing in full lines, a blank stamped from a steel plate, the outline of which plate is indicated by dotted lines.

Figs. 3 and 4 are top plan and side views, respectively, of the blank shown in Fig. 2, after having been subjected to the first operation.

Figs. 5 and 6 are top plan, and side views, respectively, of a punch used in the first operation.

Fig. 7 is a plan view of a die used in the first operation.

Fig. 8 is a sectional view, upon the line 8—8 of Fig. 7, of the die shown in Fig. 7.

Figs. 9 and 10 are top plan and side views, respectively, of the barrel at the end of the second operation.

Figs. 11 and 12 are similar views of the barrel at the end of the third operation.

Figs. 13 and 14 are similar views of the barrel at the end of the fourth operation.

Figs. 15 and 16 are similar views of the barrel at the end of the fifth operation.

Figs. 17 and 18 are similar views of the barrel at the end of the sixth operation.

Figs. 19 and 20 are top plan, and side views, respectively, of the punch used in the sixth and seventh operations.

Fig. 21 is a bottom plan view of the punch shown in Fig. 20.

Fig. 22 is a top plan view of the die used in the sixth operation.

Fig. 23 is a sectional view of the same, taken upon the line 23—23 of Fig. 22.

Fig. 24 is a top plan view of the die used in the seventh operation.

Fig. 25 is a sectional view of the same, the section being taken on the line 25—25 of Fig. 24.

Figs. 26 and 27 are top plan, and side views respectively, of the barrel at the completion of the seventh operation, said barrel being shown, enlarged, in perspective in Fig. 1.

The barrel shown in Fig. 1 is indicated as a whole by the letter A and the same consists of an elongated, rectangular shaped housing, having two side members 1, 1, two end members 2, 2, and a closed bottom member 3,— the other end of the barrel being open, as shown. The side members 1 and 2 are joined by rounded corners 4, 4. Inside of the bottom member 3 are a pair of raised bosses or lugs 5, 5. In this instance, said lugs are semi-circular in shape, integral with the bottom plate 3, and are formed during the sixth operation, hereinafter described, by indenting the bottom plate 3 from its under or outer surface. The barrel A is thus provided with interior raised up lugs 5, 5, integral with the bottom plate 3.

The dotted line shown in Fig. 2 indicates a plate of sheet steel B, which may be ⅜" thick, 33" wide and 34" long, to form a barrel of the particular shape and dimensions illustrated in Fig. 1. This plate is blanked out to form the blank C, having four concave side edges or margins 6, 6, joined by four rounded corners 7, 7. The blank C thus formed is placed in a suitable furnace and heated to a temperature of approximately 1400° F. and then submitted to the action of a hydraulic press, having punches and dies of the form illustrated in Figs. 5 to 8 inclusive, to produce a cup-shaped structure which is indicated as a whole by the letter D,—see Figs. 3 and 4.

After this first operation and while the cup D is still hot, it is transferred to another hydraulic press, where it is subjected to a set of dies similar in all respects to that shown in Figs. 3 to 8, inclusive, excepting that they are slightly smaller in dimensions. The result of the second operation is shown in Figs. 9 and 10, by the cup designated E. It will be seen that the cup E is of greater depth than the cup D, although substantially the same configuration.

The cup E is then placed in the furnace and reheated to about the same temperature, namely: approximately 1400° F. The heated cup E is then subjected to the action of a hydraulic press, having punches and dies similar to those shown in Figs. 5 to 8, inclusive, but of smaller dimensions, with the result that it is drawn into the form shown at F, in Figs. 11 and 12.

It is then transferred to another hydraulic press having punches and dies of still different dimensions, and while yet hot, is drawn still further so that at the end of the fourth operation, the cup is of the configuration and shape shown at G,—see Figs. 13 and 14.

The elongated cup G is now placed in the furnace and subjected to approximately 1400° F. temperature, and then transferred to another hydraulic press, where the punches and dies are similar to those before used but of appropriate size. At the end of the fifth operation, the configuration has been changed into the more elongated cup shown at H,—see Figs. 15 and 16.

While still hot, the cup H, now rapidly approaching the final stages and in barrel or housing form, is subjected to the action of a suitable die and punch, such as shown in Figs. 19, 20, 21 and 22, and presently assumes the shape and configuration indicated at I, in Figs. 17 and 18.

The punch 8 (Fig. 20) used in this sixth operation, has on its lower face 9 recesses indicated at 10, which are complementally arranged with respect to the raised up portions 11 upon the face of the die 12 (Figs. 22, 23) which form in the end 3 of the housing, the raised up bosses or lugs 5 shown in Figs. 1 and 17. The cup or housing I, shown in Fig. 18, is now still sufficiently heated to be subjected to the final drawing operation. This is accomplished by removing the dies shown in Figs. 22, 23, and replacing them with the dies shown in Figs. 24, 25. The punch shown in Fig. 20 is used in both the sixth and seventh operations. At the end of the seventh operation, the housing or barrel I is shown in still further elongated form, as indicated by the letter J, in Figs. 26 and 27. The barrel is then in its finished form, as shown in Fig. 1, with the exception of its length. The slight excess of metal at the top or open end of the barrel J and above the dotted line 13, is now sawed off, so as to leave a finished top edge 14 to the finished barrel A. This finished barrel A is approximately 24" in length and has an interior cross sectional dimension of substantially 13" x 9", when made from a plate of the dimensions first above stated and by the method hereinabove described.

Of course, it will be understood that in performing the second, third, fourth and fifth operations, the punch and dies, while of the same general shape shown in Figs. 5 and 8, will be progressively of reduced size in cross section, and that the punches will be progressively of greater length. It will also be understood that, while the punch 8 will be used in both the sixth and seventh operations, in the sixth operation said punch 8 is used in connection with the die shown in Figs. 22 and 23, and in the seventh operation, it is used with the dies shown in Figs. 24 and 25. It will be noted that the die shown in Fig. 25 is provided with a centrally formed cavity. Since the punch 8 forces the barrel downwardly into said cavity, during the seventh operation, it is clear that the barrel J will be made longer than the barrel I, formed by the sixth operation.

In one use to which the barrel is subjected in practice in draft gear constructions, it is necessary to have interior bosses or lugs about which the draft gear parts such as the springs, may rest and contact. For that reason, I have illustrated the lugs 5, 5, as semi-circular in contour. It will be manifest, however, that these lugs may be of any shape desired and that different conformations of the lugs 5 may be had by changing the shape of the recess 10 in the punch 8 and making the dies illustrated in Figs. 22, 23, to correspond.

It will be observed that the blank C has been subjected to the action of heat three times; first, an original heating operation and then two reheatings, and that by the use of the method just described, a fine and smooth finish has been imparted to the structure and that a strong and durable barrel or housing has been formed.

It will be manifest that a housing drawn from a plate of sheet steel in the manner described, is far superior to a barrel of similar dimensions and of the same cross sectional area, made of cast steel, cast iron or any other metal.

I am aware that cup shaped structures have been made by subjecting a metal blank to the action of pressing punches and dies, and I do not claim the same broadly. I believe, however, that I am the first to produce from a plate of sheet steel, a seamless, drawn steel barrel or housing closed at one end and open at the other, adapted for use as a barrel or housing for a draft gear.

I claim as my invention:

1. As a new article of manufacture, a seamless, drawn steel draft gear barrel or housing, closed at one end and open at the other, of greater length than its cross sectional dimension.

2. As a new article of manufacture, a seamless, drawn steel draft gear barrel or housing, closed at one end and open at the other, of greater length than cross sectional dimension, and having inwardly projecting lugs on its bottom or closed end.

3. A new article of manufacture, consisting of a seamless, drawn steel draft gear barrel or housing having straight side and end walls united by curved or rounded corners, said barrel being closed at one end and open at the other.

4. A new article of manufacture, consisting of a seamless, drawn steel draft gear barrel or housing having straight side and end walls united by curved or rounded corners, being closed at one end and open at the other, and provided with integral inwardly projecting lugs on its bottom wall.

5. A method of making a seamless, drawn steel draft gear barrel or housing, consisting of forming a suitable blank from a plate of sheet steel, heating the blank to a high temperature, then subjecting the blank to the action of a punch and die in an hydraulic press to form a shallow cup-shaped structure, and then subjecting it to a series of drawing or cupping operations in hydraulic presses having punches and dies of progressively smaller cross sectional dimensions and larger longitudinal dimension, until the desired size is attained, reheating the partially formed blank meanwhile, and finally removing the surplus metal from the open end of the cup-shaped structure to form the finished article.

6. The method of making a draft gear barrel or housing from a plate of sheet steel, consisting in forming a suitable blank from said plate, heating the blank to a high temperature, subjecting it to the action of a hydraulic press to form a shallow, cup-shaped structure, and while still hot, subjecting it to a second press to form a greater cup-shaped indentation, then reheating to a temperature of substantially the same degree as for the first operation, subjecting the reheated article to two successive drawing or cupping operations to elongate the structure and narrow the outside dimensions, subjecting the partially finished blank to a second reheating operation and while hot, subjecting it to two successive drawing or cupping operations, and forming interiorly raised lugs on the bottom of the cup during the last mentioned drawing operation, subjecting the cupped article to a final drawing operation after said lugs have been so formed and finally in trimming of the excess metal from the open end of the article.

In testimony that I claim the foregoing as my invention I affix my signature, in the presence of two witnesses, this 24th day of August, 1920.

C. RICHARD JERNBERG.

Witnesses:
B. L. MACGREGOR,
L. A. PERLOW.